United States Patent
Mitra et al.

(10) Patent No.: US 11,669,857 B2
(45) Date of Patent: *Jun. 6, 2023

(54) AUTOMATIC RESOLUTION OF THE EXPLORE-EXPLOIT DECISION IN OMNICHANNEL SETTINGS

(71) Applicant: Walmart Apollo, LLC, Bentonville, AR (US)

(72) Inventors: Abhimanyu Mitra, San Jose, CA (US); Sinduja Subramaniam, San Jose, CA (US); Evren Korpeoglu, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/353,145

(22) Filed: Jun. 21, 2021

(65) Prior Publication Data

US 2021/0312492 A1    Oct. 7, 2021

Related U.S. Application Data

(63) Continuation of application No. 15/884,173, filed on Jan. 30, 2018, now Pat. No. 11,042,895.

(51) Int. Cl.
*G06Q 30/00* (2023.01)
*G06Q 30/0242* (2023.01)
(Continued)

(52) U.S. Cl.
CPC ......... *G06Q 30/0242* (2013.01); *H04L 67/02* (2013.01); *H04L 67/535* (2022.05); *G06F 16/285* (2019.01)

(58) Field of Classification Search
None
See application file for complete search history.

(56) References Cited

U.S. PATENT DOCUMENTS

| | | | |
|---|---|---|---|
| 8,909,683 B1* | 12/2014 | Ledet | H04L 67/52 707/804 |
| 10,360,568 B2* | 7/2019 | Bhatia | G06Q 30/0246 |

(Continued)

OTHER PUBLICATIONS

Johnston; Strategic Online Advertising Modeling User Behavior with Advertising; SIEDS 2006; pp. 162-167; 2006.*

(Continued)

*Primary Examiner* — Radu Andrei
(74) *Attorney, Agent, or Firm* — Bryan Cave Leighton Paisner LLP

(57) ABSTRACT

A method including tracking impression response data in response to online impressions of content elements displayed to users of a website. The impression response data can include (i) first responses by the users in one or more physical stores in response to the online impressions, and (ii) second responses by the users in the website in response to the online impressions. The method also can include receiving a request from a user of the users to display a webpage of the website. The method additionally can include generating the webpage to include a content element selected from among the content elements based on a classification of the user and the impression response data for the content elements. Other embodiments of related systems and methods are described.

20 Claims, 6 Drawing Sheets

(51) Int. Cl.
*H04L 67/02* (2022.01)
*H04L 67/50* (2022.01)
*G06F 16/28* (2019.01)

(56) References Cited

U.S. PATENT DOCUMENTS

| | | |
|---|---|---|
| 11,042,895 B2 | 6/2021 | Mitra et al. |
| 2002/0161670 A1* | 10/2002 | Walker ............... G06Q 30/0603 705/26.1 |
| 2004/0059626 A1 | 3/2004 | Smallwood |
| 2008/0256061 A1 | 10/2008 | Chang et al. |
| 2010/0121624 A1 | 5/2010 | Roy et al. |
| 2011/0131246 A1 | 6/2011 | Diaz |
| 2011/0213655 A1 | 9/2011 | Henkin et al. |
| 2011/0302126 A1 | 12/2011 | Sekino |
| 2011/0320437 A1 | 12/2011 | Kim et al. |
| 2012/0059788 A1 | 3/2012 | Sekino |
| 2012/0143790 A1 | 6/2012 | Wang et al. |
| 2012/0177121 A1* | 7/2012 | Tripathi ............... H04N 19/154 375/E7.243 |
| 2012/0185481 A1 | 7/2012 | Björk et al. |
| 2012/0303349 A1 | 11/2012 | Roy et al. |
| 2012/0310745 A1* | 12/2012 | Bhatia ................. G06Q 30/02 705/14.66 |
| 2013/0080247 A1 | 3/2013 | Parsana et al. |
| 2013/0084002 A1 | 4/2013 | Bhardwaj et al. |
| 2013/0191381 A1 | 7/2013 | Jin et al. |
| 2013/0218973 A1* | 8/2013 | Good ................. H04L 67/306 709/204 |
| 2013/0227384 A1* | 8/2013 | Good ................. G06Q 30/0279 709/204 |
| 2013/0259379 A1 | 10/2013 | Slaney et al. |
| 2013/0325857 A1 | 12/2013 | Jin et al. |
| 2014/0258277 A1 | 9/2014 | Cheng et al. |
| 2014/0279819 A1* | 9/2014 | Macaro ............... G06F 17/18 706/52 |
| 2015/0012614 A1* | 1/2015 | Kolam ................ G06F 16/972 709/218 |
| 2015/0278837 A1* | 10/2015 | Lahav ................ G06Q 30/0204 705/7.33 |
| 2015/0332372 A1 | 11/2015 | Hariri et al. |
| 2015/0356658 A1 | 12/2015 | Morris |
| 2015/0378578 A1 | 12/2015 | Zhang et al. |
| 2016/0210689 A1 | 7/2016 | Hummel |
| 2016/0253734 A1 | 9/2016 | Ravikant |
| 2017/0061481 A1 | 3/2017 | Wee et al. |
| 2017/0091319 A1 | 3/2017 | Legrand et al. |
| 2017/0098236 A1 | 4/2017 | Lee et al. |
| 2017/0140053 A1 | 5/2017 | Vorobev et al. |
| 2017/0186070 A1* | 6/2017 | Dong .................. G06F 40/14 |
| 2017/0192983 A1* | 7/2017 | Weng .................. G06F 40/106 |
| 2017/0278114 A1 | 9/2017 | Renders |
| 2017/0308609 A1 | 10/2017 | Berkhin et al. |
| 2018/0300748 A1* | 10/2018 | Flaks ................. G06Q 30/0243 |
| 2018/0309720 A1* | 10/2018 | Cochran ............. G06F 3/0482 |
| 2019/0220871 A1* | 7/2019 | Greenberger ............. G06F 7/08 |
| 2019/0324988 A1* | 10/2019 | Wayne .................. G06N 3/045 |

OTHER PUBLICATIONS

Tate; Evaluating Adversarial Interfaces_ An Automated Approach; IEEE 2016; pp. 56-68; 2016.*

Johnston et al., "Strategic Online Advertising: Modeling Internet User Behavior with Advertising.com," Proceedings of the 2006 Systems and Information Engineering Design Symposium, pp. 162-167, 2006.

Tate et al., "Evaluating Adversarial Interfaces, An Automated Approach," IEEE Technology and Society Magazine, Mar. 2016, pp. 56-68, 2016.

* cited by examiner

405

| 501 — Generating a first random sample from a posterior distribution for a first channel conversion being performed for the content element by users in the classification of the first user |

| 502 — Generating a second random sample from a posterior distribution for a second channel conversion being performed for the content element by users in the classification of the first user |

| 503 — Determining a weighting for the content element based on a maximum of the first random sample and the second random sample |

| 504 — Selecting the selected content element from among the content elements based on a maximum of the weightings of the content elements |

FIG. 5

AUTOMATIC RESOLUTION OF THE EXPLORE-EXPLOIT DECISION IN OMNICHANNEL SETTINGS

CROSS-REFERENCE TO RELATED APPLICATIONS

This application is a continuation of U.S. patent application Ser. No. 15/884,173, filed Jan. 30, 2018. U.S. patent application Ser. No. 15/884,173 is incorporated herein by reference in its entirety.

TECHNICAL FIELD

This disclosure relates generally to automated decision engines, and relates more particularly to automatic resolution of the explore-exploit decision in omnichannel settings.

BACKGROUND

Many websites display content that is regularly changing. Moreover, there is a choice between exploiting content that is known to be effective and exploring new content to learn its effectiveness. The explore-exploit choice is compounded when considering the context of the users in omnichannel settings.

BRIEF DESCRIPTION OF THE DRAWINGS

To facilitate further description of the embodiments, the following drawings are provided in which:

FIG. 5 illustrates a flow chart for a block of generating a webpage with a selected content element, according to the embodiment of FIG. 4.

Figure 1:
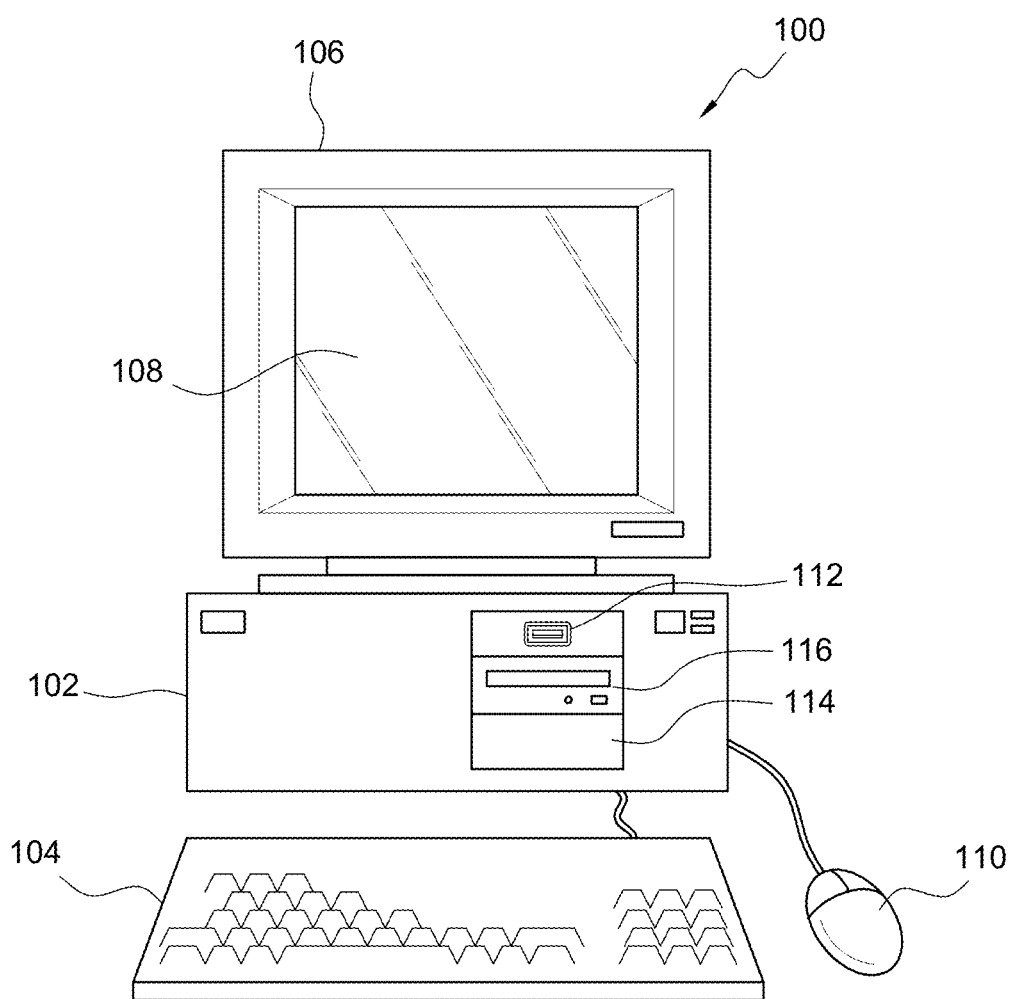
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
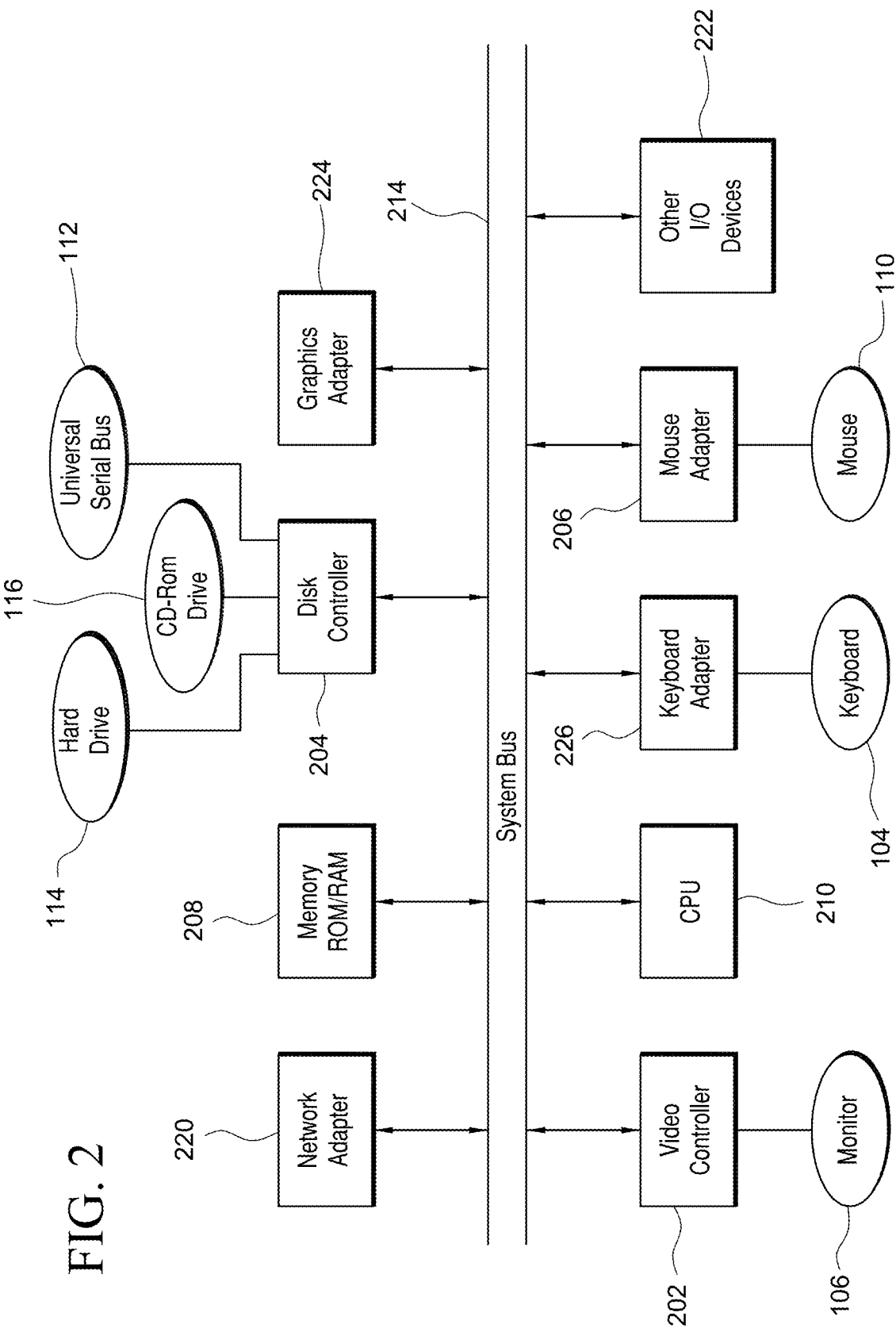
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
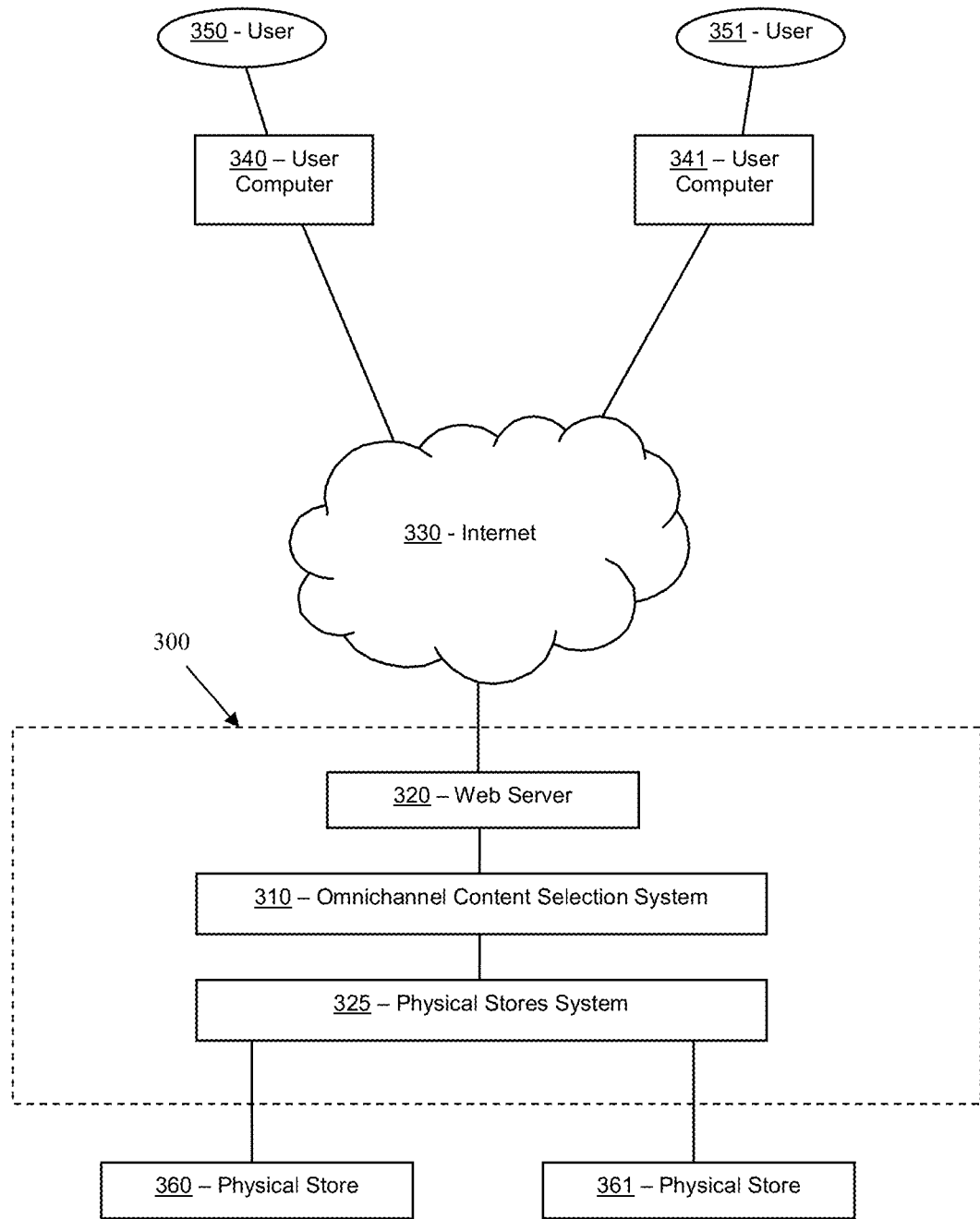
FIG. 3 illustrates a block diagram of a system that can be employed for automatic resolution of the explore-exploit decision in omnichannel settings, according to an embodiment.

Turning ahead in the drawings, FIG. 3 illustrates a block diagram of a system 300 that can be employed for automatic resolution of the explore-exploit decision in omnichannel settings, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an omnichannel content selection system 310, a web server 320, and/or a physical stores system 325.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Omnichannel content selection system 310, web server 320, and/or physical stores system 325 can each be a computer system, such as computer system 100 (FIG. 1), as described above, and can each be a single computer, a single server, or a cluster or collection of computers or servers, or a cloud of computers or servers. In another embodiment, a single computer system can host omnichannel content selection system 310, web server 320, and/or physical stores system 325. Additional details regarding omnichannel content selection system 310, web server 320, and/or physical stores system 325 are described herein.

In some embodiments, web server 320 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. In many embodiments, web server 320 can host one or more websites. For example, web server 320 can host a website that allows users to browse and/or search for items (e.g., products), to add items to an electronic cart, and/or to purchase items, in addition to other suitable activities.

In several embodiments, physical stores system 325 can be in data communication with the point-of-sale systems in physical stores, such as physical store 360 and/or physical store 361. In many embodiments, physical stores 360-361 each can be a physical store, such as a brick-and-mortar store, that is associated (e.g., operated by a common business entity or entities under common control) with the website hosted by web server 320. In many embodiments, many of the items sold at the physical stores (e.g., 360-361) can be the same as the items sold on the website. In some embodiments, physical stores system 325 can be a distributed system that includes one or more systems in each of the physical stores (e.g., 360-361). In other embodiments, physical stores system 325 can be a centralized system that communicates with systems in the physical stores (e.g., 360-361). In several embodiments, physical stores system 325 can track purchases made by users (e.g., 350-351) in the physical stores (e.g., 360-361).

In a number of embodiments, omnichannel content selection system 310 and/or physical stores system 325 can link transactions made by a user (e.g., 350-351) at one or more physical stores (e.g., 360-361) to each other and can link these transactions to transactions and/or other activity by the user on the website hosted by web server 320. These linkages can be done based on the payment information provided by the user at the one or more physical stores and on the website, such as the credit card information used.

In some embodiments, an internal network that is not open to the public can be used for communications between omnichannel content selection system 310, web server 320, and/or physical stores system 325 within system 300. Accordingly, in some embodiments, omnichannel content selection system 310 and/or physical stores system 325 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, omnichannel content selection system 310, web server 320, and/or physical stores system 325 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to omnichannel content selection system 310, web server 320, and/or physical stores system 325 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of omnichannel content selection system 310, web server 320, and/or physical stores system 325. In a similar manner, the processors and/or the non-transitory computer-readable media can be local and/or remote to each other.

Meanwhile, in many embodiments, omnichannel content selection system 310, web server 320, and/or physical stores system 325 also can be configured to communicate with one or more databases. The one or more databases can include a product database that contains information about products, items, or SKUs (stock keeping units), for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between omnichannel content selection system 310, web server 320, physical stores system 325, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS- 136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, one or more of the webpages displayed by the website hosted by web server 320 can include one or more content elements. In some embodiments, these content elements can include information about one or more items that are available on the website. For example, a webpage can include a content element that includes links to item pages for three separate items. In many embodiments, these items can be featured and/or promoted items. In some embodiments, the items can be displayed sequentially, such as displaying one at a time in a three-part cycle of three items, or displaying 5 items at a time in a three-part cycle of fifteen items. These content elements are sometimes referred to as item modules and/or carousels. Conventionally, these content elements are designed by merchants, and there are many possible content elements from which to select when displaying one or more content elements on a webpage of the website. In some conventional approaches, content elements have been generated based on the past purchases of items by a user (e.g., 350-351) to facilitate easy reorder (ERO) of these items. In some such cases, the items in a content element designed for ERO that are displayed to the user (e.g., 350-351) on the website can include items that were purchased by the user in physical stores (e.g., 360-361).

Selecting a content element from among a group of content elements can present the explore-exploit dilemma, particularly when the content elements are regularly changing. Specifically, there is a choice between exploiting content elements that are known to be effective and exploring new content elements to learn their effectiveness. The "exploit" option in the explore-exploit dilemma arises when certain content elements are known, based on past experience, to be effective at achieving an objective. Examples of the objective can be increasing conversions (e.g., purchases) based on the display of the content element or increasing click-through-rates based on the display of the content element. Based on showing content elements in the past, it can be determined that certain content elements are more effective at achieving an objective than other content elements. To increase conversions associated with a webpage (e.g., the homepage) of a website hosted by web server 320, for example, system 300 can decide to display content element that have produced high conversion rates in the past. Exploiting these content elements that are known to be effective can provide customer satisfaction and can further business objectives.

By contrast, the "explore" option in the explore-exploit dilemma arises when a new content element is available for selection to be displayed on the website and information about its effectiveness at achieving the objection would be enhanced by displaying the content element and collecting feedback. Without testing a new content element on the website, system 300 lacks the data to decide whether the content element should be exploited. As new content elements can be added regularly, due to new items, changing market demands, or different business priorities, for example, there can be a lack of sufficient data as to whether these new content elements are effective and should be exploited. Exploring these new content elements can facilitate discovering which new content elements are effective, so that content elements that are found to be effective can be exploited.

Contextual explore-exploit can add an additional layer of complexity, in which the approach to resolving the explore-exploit dilemma can depend on the context. For example, the context could be the user (e.g., 350-351), in which case the approach to resolving the explore-exploit dilemma can be to adapt according to one or more characteristics of the user. Another example of the explore-exploit dilemma appears in deciding recommended items in recommendation modules in item pages. For example, an item page can feature an item, and describe the item. This item can be called the anchor item for the item page. The item page also can include additional items that can be recommended. Selection of these recommended items can involve the explore-exploit dilemma. Continuous exploration arises here because new items, and new content elements, are regularly added to the website.

Sometimes, a business group that operates a website, such as the website hosted by web server 320, also operates physical stores, such as physical stores 360-361. Such an arrangement presents the possibility of users interacting in either or both of these channels. For example, the first channel can be the physical stores (e.g., 360-361), which is also referred to as "offline," or "store," and the second channel can be the website, which is also referred to as "online." In an omnichannel setting, there can be many different objectives, such as considering if the content elements on the homepage focus on driving online conversion or instead focus on driving offline conversion. Conventional approaches to resolve the explore-exploit dilemma often ignore the offline conversion option. Yet many users (e.g., 350-351) visit the website to view information about items, without purchasing the items through the website, and then go to physical stores (e.g., 360-361) to purchase the items viewed on the website. Moreover, certain items are more typically purchased in physical stores, such as grocery items, for example, and other items are more typically purchased online, such as electronics, for example.

In many embodiments, system 300 can provide an automated approach to resolving the explore-exploit dilemma in the omnichannel setting and based on the context of the user. For example, if a user (e.g., 350-351) that typically purchases items through the physical stores (e.g., 360-361) visits the website, the user can be more likely to see content elements designed to drive conversion in the physical stores. On the other hand, a user (e.g., 350-351) that typically purchases items online can be more likely to see content elements suited to drive online conversion in the website.

Considering the omnichannel setting in resolving the explore-exploit dilemma can add additional considerations, such as deciding when exploiting should be done for each objective, and deciding how to target different objectives for different contexts when deciding to exploit. The omnichannel setting in the explore-exploit dilemma brings in a complexity in the modeling that cannot be resolved by treating it as a contextual-only explore-exploit dilemma. In a contextual explore-exploit, given the context, the dilemma is choosing only whether to explore or to exploit. In an omnichannel setting, by contrast, the dilemma involves further deciding which channel to focus on when exploiting.

As described above, conventional approaches generally ignore the differences in responses in the different channels. But approaches that involve consolidation or summarization of metrics across the channels when deciding to exploit, such as by adding up the conversion rates from the physical stores and the website, and then exploiting based on the total conversion rate, lead to sub-optimal exploiting behavior from the model, as illustrated in the following example.

Consider a user $U_1$ who usually purchases through the physical stores and is known, through past performance data, to be impacted by an offline-catered content element $C_{off}$ with conversion rate of 1% offline with volatility 0.01%, but has a 0.2% conversion rate online with volatility 0.14%. User $U_1$ also is known to be impacted by an online-catered content element $C_{on}$ with a conversion rate of 0.6% offline with volatility 0.1%, and 0.6% conversion rate online with volatility 0.1%. Adding up the conversion rates for user $U_1$ would result in $C_{on}$ and $C_{off}$ being almost equivalent, having almost equal means and volatility of total conversion rates. Using this summarized information in an explore-exploit mechanism would result in deciding that these two content elements $C_{on}$ and $C_{off}$ are equivalent for user $U_1$, and would result in treating these content elements in the same way. However, using the more granular information can result in exploiting $C_{off}$ more often for user $U_1$, as there is a higher conversion rate of 1% with a low volatility of 0.01%. This approach of using channel-specific past-performance data can result in a more robust approach to resolve the explore-exploit dilemma. In many embodiments, system 300 beneficially can implement this more robust approach by selecting content elements that consider both the context and the channel setting in resolving the explore-exploit dilemma.

Figure 4:
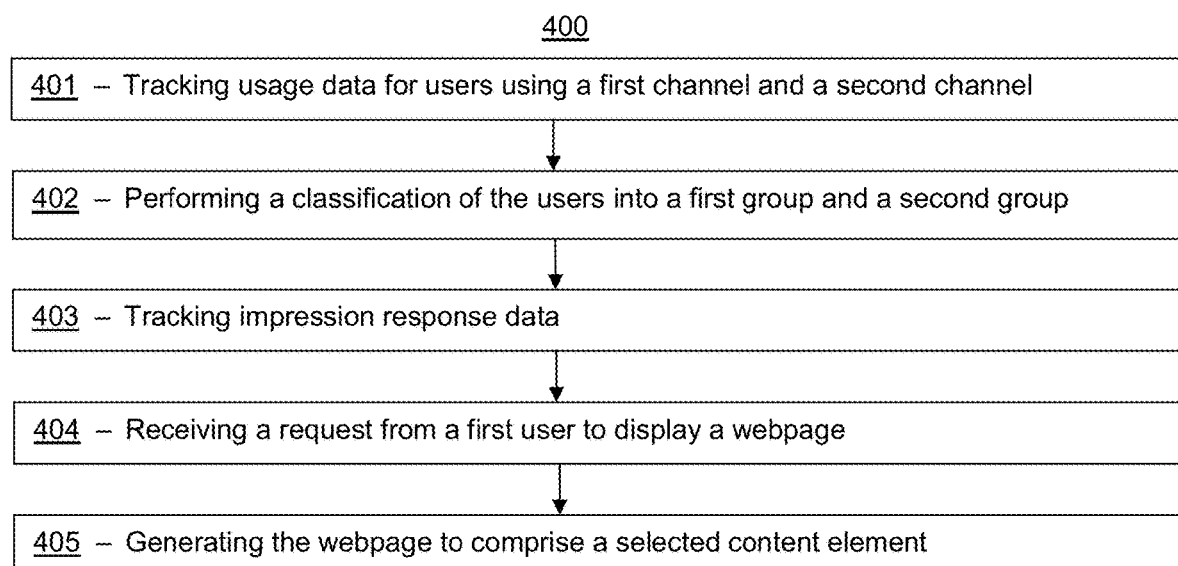
FIG. 4 illustrates a flow chart for a method, according to another embodiment.

Turning ahead in the drawings, FIG. 4 illustrates a flow chart for a method 400. In some embodiments, method 400 can be a method of automatic resolution of the explore-exploit decision in omnichannel settings. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as omnichannel content selection system 310 (FIG. 3), web server 320 (FIG. 3), and/or physical stores system 325 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 401 of tracking usage data for users using a first channel and a second channel. The users can be similar or identical to users 340-341 (FIG. 3). In many embodiments, the first channel can be one or more physical stores associated with a website, and the second channel can be the website. The physical stores can be similar or identical to physical stores 360-361 (FIG. 3). The website can be similar or identical to the website hosted by web server 320 (FIG. 3). In many embodiments, the usage data can include information about the users using and/or completing transactions at the first channel and the second channel. In several embodiments, the usage data can include the quantity of conversions by each of the users using the first channel and the quantity of conversions by each of the users using the second channel during a first time period. In some embodiments, the first time period can be approximately three months. In other embodiments, the first time period can be one month, two months, four months, six months, a year, or another suitable time period. As an example, the usage data can track that a user purchased items at the one or more physical stores twice during the past three months, and that the use also purchase items online twice during the past three months. In other embodiments, usage data can include other metrics instead of, or in addition to, the quantity of conversions by each of the users for each of the channels. For example, the usage data for each user can include metrics such the number of times the user used the website, add-to-cart statistics on the website for the user, purchase amounts for the user on the website and/or in the one or more physical stores, and/or other suitable information.

In several embodiments, method 400 also can include a block 402 of performing a classification of first users of the users into a first group and second users of the users into a second group. In many embodiments, the classification can be based on the usage data. In some embodiments, the classification of the first users into the first group can be conditioned on: (a) a quantity of conversions using the first channel for each of the first users in the first group being greater than or equal to a first threshold during the first time period, and (b) a quantity of conversions using the second channel for each of the first users in the first group being less than a second threshold during the first time period. In several embodiments, the classification of the second users into the second group can be conditioned on the quantity of the conversions using the second channel for each of the second users in the second group being greater than or equal to the second threshold during the first time period. In some embodiments, the first threshold is one, and the second threshold also is one. In other embodiments, the first threshold can be two, three, four, five, or another suitable number, and/or the second threshold can be two, three, four five, or another suitable number. In some embodiments, the first threshold can be the same as the second threshold. In other embodiments, the first threshold can be different from the second threshold. In yet other embodiments, the classification of the users into the first group or the second group can be based on other criteria and/or rules using the usage data.

As an example, users who have no purchase history on the website in the past three months can be considered "store customers" and can be classified into the first group. Users who have purchased items on the website at least once in the past three months can be considered "online customers." In other embodiments, as explained above, other criteria and/or rules can be used to classify the users into the first group or the second group.

In many embodiments, the classification of each of the users can define a context for the user. In several embodiments, the classification of a user into a group or context can be transient, and can change readily. For example, suppose user A purchased items only in physical stores in the last three months. User A then visits the website, and can be classified, based on the conditions described above, into the first group as a store customer. If user A then makes a purchase on the web site and if user A then visits the web site a week later, then user A can be classified on this subsequent visit, based on the conditions described above, as an online customer.

In a number of embodiments, method 400 additionally can include a block 403 of, for each impression of a content element of content elements being displayed on a website to a user of the users, tracking impression response data including: (a) whether the user is grouped into the first group or the second group, and (b) response data including: (i) a first response by the user to the content element in the first channel, and (ii) a second response by the user to the content element in the second channel. In many embodiments, each of the content elements can include information regarding one or more items available on the website. The content elements can be similar or identical to the content elements described above. Each time a content element is displayed to a user can be referred to as an "impression."

In many embodiments, the first response can indicate whether or not the user responded to the content element in the first channel, and the second response can indicate whether or not the user responded to the content element in the second channel. In some embodiments, for the response data, the first response by the user to the content element in the first channel indicates whether or not the user performed a first channel conversion associated with the content element, and/or the second response by the user to the content element in the second channel indicates whether or not the user performed a second channel conversion associated with the content element. In other embodiments, a metric other than conversion can be used. For example, a metric such as click-through-rate can be used to indicate a second response by the user to the content element in the second channel.

In several embodiments, the first channel conversion can be referred to as a "store conversion," and the second channel conversion can be referred to as an "online conversion." In several embodiments, the first channel conversion can be tracked as having been performed when the user purchased at least one of the items displayed in the content element in the first channel within a second time period of the content element being displayed on the website to the user. In some embodiments, the second time period can be approximately seven days. In other embodiments, the second time period can be approximately one day, two days, three days, four days, five days, six days, two weeks, three weeks, or another suitable time period. As an example, if the content element is displayed to a user A on a webpage on the website on a first date, called the impression date, and if user A purchases at least one of the items shown in the content element from a physical store within seven days from the impression date, then the impression can be tracked as a first channel conversion, also referred to as a store conversion.

In a number of embodiments, the second channel conversion can be tracked as having been performed when the user purchased at least one of the items displayed in the content element in the second channel within a third time period of the content element being displayed on the website to the user. In some embodiments, the third time period can be approximately seven days. In other embodiments, the third time period can be approximately one day, two days, three days, four days, five days, six days, two weeks, three weeks, or another suitable time period. In several embodiments, the third time period can be the same as the second time period. In other embodiments, the third time period can be different from the second time period. As an example, if the content element is displayed to a user A on a webpage on the website on the impression date, and if user A purchases at least one of the items shown in the content element through the website within seven days from the impression date, then the impression can be tracked as a second channel conversion, also referred to as an online conversion. In some embodiments, if the impression to the user results in both a store conversion and an online conversion, the impression can be tracked as both a first channel conversion and a second channel conversion.

In several embodiments, method 400 further can include a block 404 of receiving a request from a first user of the users to display a webpage of the website. In many embodiments, the webpage can be one of the webpages on the website that includes one or more content elements. For example, the webpage can be a homepage of the website, or another webpage of the website that includes one or more content elements.

In a number of embodiments, method 400 additionally can include a block 405 of generating the webpage to include a selected content element from among the content elements. In many embodiments, the selected content element can be selected based on the classification of the first user and the impression response data for the content elements. In several embodiments, the selected content element can be selected to resolve the explore-exploit decision by considering by the classification of the user and the differences between the channels in the past performance of the content elements. In many embodiments, block 405 can be implemented as shown in FIG. 5 and described below.

In many embodiments, selecting the selected content element can be performed each time a user requests a webpage on the website that includes a content element. Each time the first user visits a particular webpage, such as the homepage of the website, omnichannel content selection system 310 (FIG. 3) can potentially make different choices about which content element to select and display on the webpage, due to randomness introduced in the approach to selecting the module, even if the method of selecting the appropriate module remains the same. Thus, for example, each time the homepage is requested by the first user, omnichannel content selection system 310 (FIG. 3) can select a content element. In many embodiments, method 400 further can include collecting feedback by tracking the impression response data for the first user in each of the first channel and the second channel, similarly as described above in block 403 (FIG. 3).

In several embodiments, the approach to selecting the content element also can depend on the context. For example, depending on whether the classification of the user is in the first group as a store customer or the second group as an online customer, the approach to selecting the content element can be different. In a number of embodiments, each time feedback is collected, the feedback can be associated with the approach for the group in which the user is classified.

Turning ahead in the drawings, FIG. 5 illustrates a flow chart for block 405 of generating the webpage to include a selected content element from among the content elements. Block 405 is merely exemplary and is not limited to the embodiments presented herein. Block 405 can be employed in many different embodiments or examples not specifically depicted or described herein. In some embodiments, the procedures, the processes, and/or the activities of block 405 can be performed in the order presented. In other embodiments, the procedures, the processes, and/or the activities of block 405 can be performed in any suitable order. In still other embodiments, one or more of the procedures, the processes, and/or the activities of block 405 can be combined or skipped.

In several embodiments, blocks 501, 502, and/or 503, described below, can be performed for each content element of the content elements.

Referring to FIG. 5, block 405 can include a block 501 of generating a first random sample from a posterior distribution for a first channel conversion being performed for the each content element by users in the classification of the first user, based on the impression response data for the each content element. In many embodiments, the first channel conversion can be defined as described above.

Conventional approaches to selecting content elements to resolve the explore-exploit dilemma often use Thompson sampling. For example, suppose the objective is to increase a single conversion rate (that is not channel dependent) by choosing an appropriate content element on the homepage of the website. Thompson sampling would operate, each time facing the explore-exploit dilemma, by generating, for each content element C, a random sample w(C) from the posterior distribution of the conversion rate of content element C, and selected the content as follows:

Selected content element=argmax$_C$w(C)

An extension of this approach can be to choose more than one content element by choosing the top n content elements from a sorted list of w(C) in descending order. The Thompson sampling approach generally stops exploring the content elements in which the conversion rate is low, as the random sample drawn from the posterior distribution of the conversion rate of such a content element is very unlikely to be more than that of the other better-performing content elements. Moreover, the Thompson sampling approach can keep exploring content elements in which there is still a decent chance of being effective, such as a content element having a posterior conversion rate distribution with a relatively lower mean but a high volatility, indicating that limited information has been gathered about the content element. Further the Thompson sampling approach can exploit the content elements with the current highest mean in posterior conversion rate distribution, as this content element is most likely to be the selected content element.

In many embodiments, omnichannel content selection system 310 (FIG. 3) can improve the Thompson sampling approach for the omnichannel setting each time the explore-exploit dilemma is faced by generating, for each content element C and each channel ch, a random sample w(C,ch) from the posterior distribution of the conversion rate for the content element C in channel ch. For example, if the channels are store and online, two samples can be drawn, one for conversion rate in store and one for conversion rate online. The content element can be selected as follows:

Selected content element=argmax$_C$ max$_{ch}$w(C,ch)

An extension of this approach can be to choose more than one content element by choosing the top n content elements from a sorted list of max$_{ch}$ w(C,ch) in descending order.

Use of the max function across the random samples chosen for the channels can beneficially select the most promising channel. The reason behind this choice is that, in the relatively short window used to determine conversion, it is very unlikely that the many users will convert in multiple channels for the items in the selected content element, so it is preferable to place the full bet on the most promising channel. In other situations in which conversion in multiple channels is likely, a sum function can be used as follows to select the content element:

$$\text{Selected content element} = \text{argmax}_C \sum_{ch} w(C, ch)$$

This alternate version still uses the granular information about the conversion rates in each channel for each content element, and can be used in situations in which conversions in multiple channels is likely.

When also considering context in the omnichannel setting, the approach to selecting the content element can be altered by, for each context, x, generating a random sample w(x, C, ch) from the posterior distribution of the conversion rate for the content element C in channel ch for context x. The content element can be selected as follows:

Selected content element for context x=argmax$_C$ max$_{ch}$w(x,C,ch)

As described above, the context x can be characteristics of the user, anchor item features, etc. For example, context x can be whether the user is classified in the first group as a store customer or in the second group as an online customer. As a result of this adapted approach, the content elements selected to be displayed to store customers are more likely to be content elements designed for store conversion when the store customers visit the webpage, whereas the content elements selected to be displayed to online customers are more likely to be content elements designed for online conversion when the online customers visit the webpage.

Consider a simplified example in which there are three content elements, $C_1$, $C_2$, and $C_3$, from which the selected content element can be selected. For each of the content elements, the impression response data can include information that can be used to derive the probability for store conversion or online conversion depending on the context of either a store customer or an online customer. The probabilities for these four combinations of scenarios can be expressed as follows for content element $C_1$:

P(store conversion|$C_1$,store customer)

P(online conversion|$C_1$,store customer)

P(store conversion|$C_1$,online customer)

P(online conversion|$C_1$,online customer)

The probabilities can be expressed in the form of posterior distributions using conventional Bayesian techniques, such as a Beta distribution, based on the impression response data. For example, the posterior distributions for $C_1$ can be expressed based on a certain set of data in the impression response data as follows:

$P(\text{store conversion}|C_1,\text{store customer}) \sim \text{Beta}(10,90)$ $P(\text{online conversion}|C_1,\text{store customer}) \sim \text{Beta}(1,99)$ $P(\text{store conversion}|C_1,\text{online customer}) \sim \text{Beta}(4,96)$ $P(\text{online conversion}|C_1,\text{online customer}) \sim \text{Beta}(2,98)$ The posterior distributions can be regularly updated based on updates to the impression response data, as described above in block 403 (FIG. 4). For example, consider a situation in which $C_1$ has been selected for display to 10 additional store customers, out of whom 1 has had a store conversion and none have had an online conversion. Consider further that $C_1$ has been selected for display to 5 additional online customers, out of whom none have converted in store or online. By incorporating this feedback, along with the existing data, into the impression response data, the posterior distributions for $C_1$ can be expressed as follows:

$P(\text{store conversion}|C_1,\text{store customer}) \sim \text{Beta}(10+1=11, 90+9=99)$ $P(\text{online conversion}|C_1,\text{store customer}) \sim \text{Beta}(1+0=1, 99+10=109)$ $P(\text{store conversion}|C_1,\text{online customer}) \sim \text{Beta}(4+0=4, 96+5=101)$ $P(\text{online conversion}|C_1,\text{online customer}) \sim \text{Beta}(2+0=2, 98+5=103)$ Posterior distributions can be generated for content elements $C_2$ and $C_3$ in a similar manner.

If the first user who requested the webpage in block 404 (FIG. 4) is classified in the first group as a store customer, for each of the content elements, omnichannel content selection system 310 (FIG. 3) can generate a random sample for the probability of store conversion in the context of a store customer, which would be a random sample from Beta(11,99), in this example.

In several embodiments, block 405 also can include a block 502 of generating a second random sample from a posterior distribution for a second channel conversion being performed for the each content element by users in the classification of the first user, based on the impression response data for the each content element. In the example above, if the first user who requested the webpage in block 404 (FIG. 4) is classified in the first group as a store customer, for each of the content elements, omnichannel content selection system 310 (FIG. 3) can generate a random sample for the probability of online conversion in the context of a store customer, which would be a random sample from Beta(1,109), in this example.

In a number of embodiments, block 405 additionally can include a block 503 of determining a weighting for the each content element based on a maximum of the first random sample and the second random sample. For example, block 503 can involve selected the greater of the first random sample and second random sample. As explained above, the maximum of the random samples for the different channels can be determined. This approach can provide an advantageous improvement in the computer functionality over the conventional Thompson sampling approach in which only one posterior distribution is associated with a content element for a given context. In the example above, the maximum can be determined from the random samples generated from Beta(11,99) and Beta(1,109) to determine the weight for content element $C_1$. In other words, for each of the content elements, if the first user is classified in the first group as a store customer, the random sample generated for the probability of store conversion for the content element in the context of a store customer and the random sample generated for the probability of online conversion for the content element in the context of a store customer can be input into the maximum function to determine the weight of the content element. The weights for each of the other content elements, $C_2$ and $C_3$, can be generated in a similar manner.

In several embodiments, block 405 further can include a block 504 of selecting the selected content element from among the content elements such that the weighting of the selected content element is a maximum of the weightings of the content elements. For example, if the weighting for $C_2$ is higher than the weightings for $C_1$ and $C_3$, as calculated in block 503, $C_2$ can be selected as the selected content element to include in the webpage generated in block 405 (FIG. 4). The content element with the maximum weight can thus be shown to the first user. If the first user were instead classified in the second group as an online customer, then the posterior distributions used for generating the random samples in blocks 501 and 502 can be based on the context of an online customer.

Based on the randomness built into the approach, each time the user visits the webpage, the content element displayed is not guaranteed to be the same, even if the context of the user (e.g., store customer vs. online customer) remains the same, as the randomness across the posterior distributions will continue to explore content elements that are not yet proven through sufficient impression data to have low effectiveness, and will continue to exploit content elements that have been proven through impression data to be effective. The feedback received from the users will continue to change the posterior probabilities, thus influencing the approach in selecting the module. Based on actions of a user, the context of the user can change, such as if a store customer suddenly started shopping on the website to become an online customer. The approach of choosing the content element thus also adapts to the ever-changing channel preferences of the user.

Figure 6:
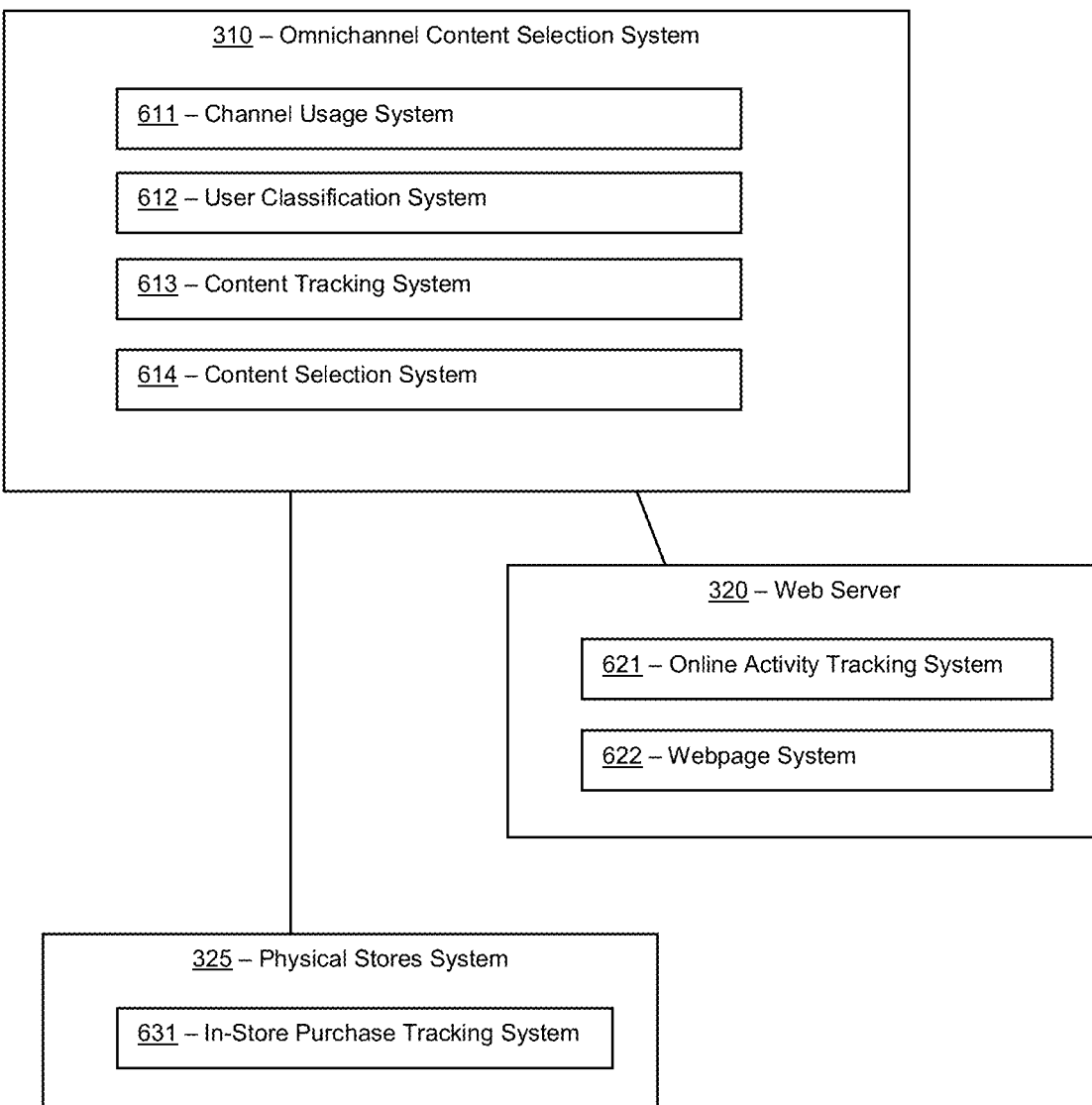
FIG. 6 illustrates a block diagram of the system of FIG. 3.

Turning ahead in the drawings, FIG. 6 illustrates a block diagram of system 300, according to the embodiment shown in FIG. 3. Omnichannel content selection system 310, web server 320, and/or physical stores system 325 are merely exemplary and are not limited to the embodiments presented herein. Omnichannel content selection system 310, web server 320, and/or physical stores system 325 can be employed in many different embodiments or examples not specifically depicted or described herein. In some embodiments, certain elements or system of omnichannel content selection system 310, web server 320, and/or physical stores system 325 can perform various procedures, processes, and/or acts. In other embodiments, the procedures, processes, and/or acts can be performed by other suitable elements or systems. In many embodiments, the systems of omnichannel content selection system 310, web server 320, and/or physical stores system 325 can be modules of computing instructions (e.g., software modules) stored at non-transitory computer readable media. In other embodiments, the systems of omnichannel content selection system 310, web server 320, and/or physical stores system 325 can be implemented in hardware.

In many embodiments, omnichannel content selection system 310 can include a channel usage system 611. In certain embodiments, channel usage system 611 can at least partially perform block 401 (FIG. 4) of tracking usage data for users using a first channel and a second channel. In many embodiments, channel usage system 611 can collect and/or perform linkages on information obtained from online activity tracking system 621 of web server 320 and in-store purchase tracking system 631 of physical stores system 325, as described below.

In a number of embodiments, omnichannel content selection system 310 can include a user classification system 612. In certain embodiments, user classification system 612 can at least partially perform block 402 (FIG. 4) of performing a classification of first users of the users into a first group and second users of the users into a second group.

In many of embodiments, omnichannel content selection system 310 can include a content tracking system 613. In certain embodiments, content tracking system 613 can at least partially perform block 403 (FIG. 4) of, for each impression of a content element of content elements being displayed on a website to a user of the users, tracking impression response data including (a) whether the user is grouped into the first group or the second group, and (b) response data including: (i) a first response by the user to the content element in the first channel, and (ii) a second response by the user to the content element in the second channel.

In a number of embodiments, omnichannel content selection system 310 can include a content selection system 614. In certain embodiments, content selection system 614 can at least partially perform block 405 (FIG. 4) of generating the webpage to include a selected content element from among the content elements, block 501 (FIG. 5) of generating a first random sample from a posterior distribution for a first channel conversion being performed for the each content element by users in the classification of the first user, based on the impression response data for the each content element, block 502 (FIG. 5) of generating a second random sample from a posterior distribution for a second channel conversion being performed for the each content element by users in the classification of the first user, based on the impression response data for the each content element, block 503 (FIG. 5) of determining a weighting for the each content element based on a maximum of the first random sample and the second random sample, and/or block 504 (FIG. 5) of selecting the selected content element from among the content elements such that the weighting of the selected content element is a maximum of the weightings of the content elements.

In a number of embodiments, web server 320 can include an online activity tracking system 621. In certain embodiments, online activity tracking system 621 can at least partially perform block 401 (FIG. 4) of tracking usage data for users using a first channel and a second channel, such as by tracking the usage data of the users on the website hosted by web server 320.

In many embodiments, web server 320 can include a webpage system 622. In certain embodiments, webpage system 622 can at least partially perform block 404 (FIG. 4) of receiving a request from a first user of the users to display a webpage of the website, and/or block 405 (FIG. 4) of generating the webpage to include a selected content element from among the content elements.

In many embodiments, physical stores system 325 can include an in-store purchase tracking system 631. In certain embodiments, in-store purchase tracking system 631 can at least partially perform block 401 (FIG. 4) of tracking usage data for users using a first channel and a second channel, such as by tracking the usage data of the users in the physical stores.

In many embodiments, the techniques described herein can provide several technological improvements. Specifically, the techniques described herein provide for automatically selecting content elements to resolve the explore-exploit decision in the context of the users and in view of an omnichannel setting. As described above, previous approaches that attempt to select content elements in view of the explore-exploit dilemma do not take into account the fact that different channels have different results, which leads to selections that are not as relevant to the users and are not as robust at exploiting effective content elements across the different channels. The techniques described herein thus provide an improvement in computer functionality beyond conventional approaches.

Moreover, the techniques described herein can run continuously to customize the selection of the content elements in view of the explore-exploit decision and to update the data used based on the impression results through each channel of the content elements displayed. In many embodiments, running these techniques continuously can provide, in real-time, content elements that are currently relevant to users, including new content elements. Moreover, the effectiveness and/or relevance of new content elements can be explored while exploiting content elements known to be effective/relevant to the users in a given context.

In many embodiments, the techniques described herein can be used continuously at a scale that cannot be handled using manual techniques. For example, the number of monthly visits to the website can exceed one hundred million, the number of registered users to the website can exceed ten million, and/or the number of content elements available for selection at any given time can exceed ten, twenty, fifty, a hundred, or even a thousand.

In a number of embodiments, the techniques described herein can solve a technical problem that arises only within the realm of computer networks, as the distinction between the offline and online channels does not exist outside the realm of computer network. Moreover, the techniques described herein can solve a technical problem that cannot be solved outside the context of computer networks. Specifically, the omnichannel context selection techniques described herein cannot be used outside the context of computer networks, in view of a lack of data, and because the online channel that is part of the techniques described herein would not exist.

In several embodiments, the techniques described herein to resolve the explore-exploit decision in omnichannel settings can advantageously be applied and/or customized in various applications. For example, the techniques described herein can be applied for driving store conversion and/or other store metrics in addition to online conversion, or driving other metrics, through a principled automated technique that resolves together the explore-exploit dilemma and the dilemma about which metric to optimize at each opportunity. As another example, the techniques described herein can incorporate omnichannel considerations in making recommendations on webpages, adapting with the changing preferences of the users, whether it be online or in store, and seamlessly changing with the changing preferences of the users.

Various embodiments can include a system including one or more processors and one or more non-transitory computer-readable media storing computing instructions configured to run on the one or more processors and perform certain acts. The acts can include tracking usage data for users using a first channel and a second channel. The acts also can include performing a classification of first users of the users into a first group and second users of the users into a second group. The classification can be based on the usage data. The acts additionally can include, for each impression of a content element of content elements being displayed on a website to a user of the users, tracking impression response data including (a) whether the user is grouped into the first group or the second group, and (b) response data including: (i) a first response by the user to the content element in the first channel, and (ii) a second response by the user to the content element in the second channel. The acts further can include receiving a request from a first user of the users to display a webpage of the website. The acts additionally can include generating the webpage to include a selected content element from among the content elements. The selected content element can be selected based on the classification of the first user and the impression response data for the content elements.

A number of embodiments can include a method being implemented via execution of computing instructions configured to run at one or more processors and stored at one or more non-transitory computer-readable media. The method can include tracking usage data for users using a first channel and a second channel. The method also can include performing a classification of first users of the users into a first group and second users of the users into a second group. The classification can be based on the usage data. The method additionally can include, for each impression of a content element of content elements being displayed on a website to a user of the users, tracking impression response data including (a) whether the user is grouped into the first group or the second group, and (b) response data including: (i) a first response by the user to the content element in the first channel, and (ii) a second response by the user to the content element in the second channel. The method further can include receiving a request from a first user of the users to display a webpage of the website. The method additionally can include generating the webpage to include a selected content element from among the content elements. The selected content element can be selected based on the classification of the first user and the impression response data for the content elements.

Additional embodiments include a system including one or more processors and one or more non-transitory computer-readable media storing computing instructions that, when executed by the one or more processors, perform certain acts. The acts can include tracking impression response data in response to online impressions of content elements displayed to users of a website. The impression response data can include (i) first responses by the users in one or more physical stores in response to the online impressions, and (ii) second responses by the users in the web site in response to the online impressions. The acts also can include receiving a request from a user of the users to display a webpage of the website. The acts additionally can include generating the webpage to include a content element selected from among the content elements based on a classification of the user and the impression response data for the content elements.

Additional embodiments include a method implemented via execution of computing instructions configured to run at one or more processors and stored at one or more non-transitory computer-readable media. The method can include include tracking impression response data in response to online impressions of content elements displayed to users of a website. The impression response data can include (i) first responses by the users in one or more physical stores in response to the online impressions, and (ii) second responses by the users in the website in response to the online impressions. The method also can include receiving a request from a user of the users to display a webpage of the web site. The method additionally can include generating the webpage to include a content element selected from among the content elements based on a classification of the user and the impression response data for the content elements.

Although automatic resolution of the explore-exploit decision in omnichannel settings has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4-5 may include different procedures, processes, and/or activities and be performed by many different modules, in many different orders, and/or one or more of the procedures, processes, or activities of FIGS. 4-5 may include one or more of the procedures, processes, or activities of another different one of FIGS. 4-5. As another example, the systems within omnichannel content selection system 310, web server 320, and/or physical stores system 325 in FIG. 6 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed by the one or more processors, perform:
   tracking impression response data in response to online impressions of content elements displayed to users of a website, wherein the impression response data comprises (i) first responses by the users in one or more physical stores in response to the online impressions, and (ii) second responses by the users in the website in response to the online impressions;
   receiving a request from a user of the users to display a webpage of the website; and generating the webpage to comprise a content element selected from among the content elements based on a classification of the user and the impression response data for the content elements.

2. The system of claim 1, wherein:
the classification of the user is either a first group or a second group;
the user is classified into the first group when: (a) a quantity of conversions using a first channel for the user is greater than or equal to a first threshold during a first time period, and (b) a quantity of conversions using a second channel for the user is less than a second threshold during the first time period; and
the user is classified into the second group when the quantity of the conversions using the second channel for the user is greater than or equal to the second threshold during the first time period.

3. The system of claim 2, wherein:
the first channel is one or more physical stores associated with the website; and
the second channel is the website.

4. The system of claim 2, wherein:
the first threshold is one.

5. The system of claim 2, wherein:
the second threshold is one.

6. The system of claim 2, wherein:
the first time period is approximately three months.

7. The system of claim 1, wherein:
each of the content elements comprises information regarding one or more items available on a second channel.

8. The system of claim 1, wherein tracking impression response data comprises:
tracking the first responses based on whether or not the users performed a first channel conversion associated with the content elements, wherein the first channel conversion is performed when a respective user of the users purchased at least one item displayed in a respective content element of the content elements in a first channel within a second time period of the respective content element being displayed on a second channel to the respective user; and
tracking the second responses based on whether or not the users performed a second channel conversion associated with the content elements; wherein the second channel conversion is performed when the respective user purchased at least one item displayed in the respective content element in the second channel within a third time period of the respective content element being displayed on the second channel to the respective user.

9. The system of claim 8, wherein:
the second time period is approximately seven days; and
the third time period is approximately seven days.

10. The system of claim 1, wherein generating the webpage to comprise the content element from among the content elements comprises:
for each respective content element of the content elements:
generating a first posterior distribution for a first channel conversion being performed for the respective content element by users in the classification of the user, based on the impression response data for the respective content element;
generating a first random sample from the first posterior distribution;

generating a second posterior distribution for a second channel conversion being performed for the respective content element by users in the classification of the user, based on the impression response data for the respective content element;
generating a second random sample from the second posterior distribution;
selecting a maximum of the first random sample and the second random sample; and
determining a weighting for the respective content element based on the maximum of the first random sample and the second random sample; and
selecting the content element from among the content elements such that the weighting of the content element is a maximum of the weightings of the content elements.

11. A method being implemented via execution of computing instructions configured to run at one or more processors and stored at one or more non-transitory computer-readable media, the method comprising:
tracking impression response data in response to online impressions of content elements displayed to users of a website, wherein the impression response data comprises (i) first responses by the users in one or more physical stores in response to the online impressions, and (ii) second responses by the users in the website in response to the online impressions;
receiving a request from a user of the users to display a webpage of the website; and
generating the webpage to comprise a content element selected from among the content elements based on a classification of the user and the impression response data for the content elements.

12. The method of claim 11, wherein:
the classification of the user is either a first group or a second group;
the user is classified into the first group when: (a) a quantity of conversions using a first channel for the user is greater than or equal to a first threshold during a first time period, and (b) a quantity of conversions using a second channel for the user is less than a second threshold during the first time period; and
the user is classified into the second group when the quantity of the conversions using the second channel for the user is greater than or equal to the second threshold during the first time period.

13. The method of claim 12, wherein:
the first channel is one or more physical stores associated with the website; and
the second channel is the website.

14. The method of claim 12, wherein:
the first threshold is one.

15. The method of claim 12, wherein:
the second threshold is one.

16. The method of claim 12, wherein:
the first time period is approximately three months.

17. The method of claim 11, wherein:
each of the content elements comprises information regarding one or more items available on a second channel.

18. The method of claim 11, wherein tracking impression response data comprises:
tracking the first responses based on whether or not the users performed a first channel conversion associated with the content elements, wherein the first channel conversion is performed when a respective user of the users purchased at least one item displayed in a respective content element of the content elements in a first channel within a second time period of the respective content element being displayed on a second channel to the respective user; and tracking the second responses based on whether or not the users performed a second channel conversion associated with the content elements; wherein the second channel conversion is performed when the respective user purchased at least one item displayed in the respective content element in the second channel within a third time period of the respective content element being displayed on the second channel to the respective user.

19. The method of claim 18, wherein:
the second time period is approximately seven days; and
the third time period is approximately seven days.

20. The method of claim 11, wherein generating the webpage to comprise the content element from among the content elements comprises:

for each respective content element of the content elements:
generating a first posterior distribution for a first channel conversion being performed for the respective content element by users in the classification of the user, based on the impression response data for the respective content element;

generating a first random sample from the first posterior distribution;

generating a second posterior distribution for a second channel conversion being performed for the respective content element by users in the classification of the user, based on the impression response data for the respective content element;

generating a second random sample from the second posterior distribution;

selecting a maximum of the first random sample and the second random sample; and determining a weighting for the respective content element based on the maximum of the first random sample and the second random sample; and selecting the content element from among the content elements such that the weighting of the content element is a maximum of the weightings of the content elements.

\* \* \* \* \*